United States Patent [19]
Grant

[11] 3,966,603
[45] June 29, 1976

[54] OIL-IN-WATER MONITOR

[76] Inventor: Michael G. Grant, Rte. 5 Box 1894, Fredericksburg, Va. 22401

[22] Filed: Nov. 25, 1975

[21] Appl. No.: 635,492

[52] U.S. Cl. .............................. 210/86; 73/61.1 R; 137/172; 210/23 R; 210/96 R; 210/103; 210/138; 210/540; 210/DIG. 5

[51] Int. Cl.² ........................................ B01D 35/00

[58] Field of Search ................. 73/61.1 R; 137/172; 210/23 R, 83, 86, 96 R, 103, 109, 138, 540, DIG. 5

[56] References Cited
UNITED STATES PATENTS

| | | | |
|---|---|---|---|
| 2,904,180 | 9/1959 | Bristow | 210/109 |
| 3,088,592 | 5/1963 | Clark | 210/23 R |
| 3,344,659 | 10/1967 | Chambers | 73/61.1 R |
| 3,464,258 | 9/1969 | Lerner | 73/61.1 R |
| 3,924,449 | 12/1975 | Moreau et al | 73/61.1 R |

FOREIGN PATENTS OR APPLICATIONS

| | | | |
|---|---|---|---|
| 927,912 | 6/1963 | United Kingdom | 210/103 |

*Primary Examiner*—Charles N. Hart
*Assistant Examiner*—Robert G. Mukai
*Attorney, Agent, or Firm*—R. Sciascia; R. Beers; S. Sheinbein

[57] ABSTRACT

An oil-in-water monitor for monitoring the effluent of an oil-water separator. A pressure vessel coalesces oil from the effluent and gathers the oil in a collection section which is automatically emptied after an hour. If more than a predetermined amount of oil is gathered in the hour, an oil-sensing probe sends a signal to activate a warning light valve which permit pipes to return the effluent to the separator.

If the effluent becomes too turbid, a turbidity senser activates an alarm and the valves which permit pipes to return the effluent to the separator.

If the coalescer unit clogs, an indication is given by a differential pressure gauge.

It should be understood that the foregoing abstract of the disclosure is for the purpose of providing a non-legal brief statement to serve as a searching-scanning tool for scientists, engineers and researchers and is not intended to limit the scope of the invention as disclosed herein nor is it intended that it should be used in interpreting or in any way limiting the scope of fair meaning of the appended claims.

12 Claims, 2 Drawing Figures

OIL-IN-WATER MONITOR

BACKGROUND OF THE INVENTION

This invention relates to monitoring equipment and especially to oil-in-water monitors or to water-in-oil monitors.

On naval vessels, the bilge water is often mixed with oil. The bilge water is generally discharged overboard and anti-pollution considerations dictate that the oil be separated from the bilge water before the latter is discharge into surrounding sea water.

Oil-water separators are now available to accomplish the job but monitors of the effluent liquid from the separators are not available. Monitors are needed to ascertain that the separator is performing its function properly, that is, that the oil in the effluent bilge water is less than a predetermined amount, for example, 10 parts per million or less.

SUMMARY OF THE INVENTION

The present invention comprises a system for monitoring oil in water which is being transferred from a first to a second location and, when the oil exceeds a predetermined amount, providing a warning indication and preventing the transfer of the oily water until the condition is remedied.

OBJECTS OF THE INVENTION

An object of this invention is to monitor the presence of oil in a water flow.

Another object is to provide a warning when oil in a water flow exceeds predetermined amount relative to the water.

A further object is to monitor the turbidity of a water flow.

Yet another object is to return a water flow to its source when the amount of oil in the water exceeds a predetermined amount.

Other objects, advantages, and novel features of the present invention will become apparent from the following detailed description of the invention when considered in conjunction with the accompanying drawings.

DETAILED DESCRIPTION OF THE INVENTION

Figure 1:
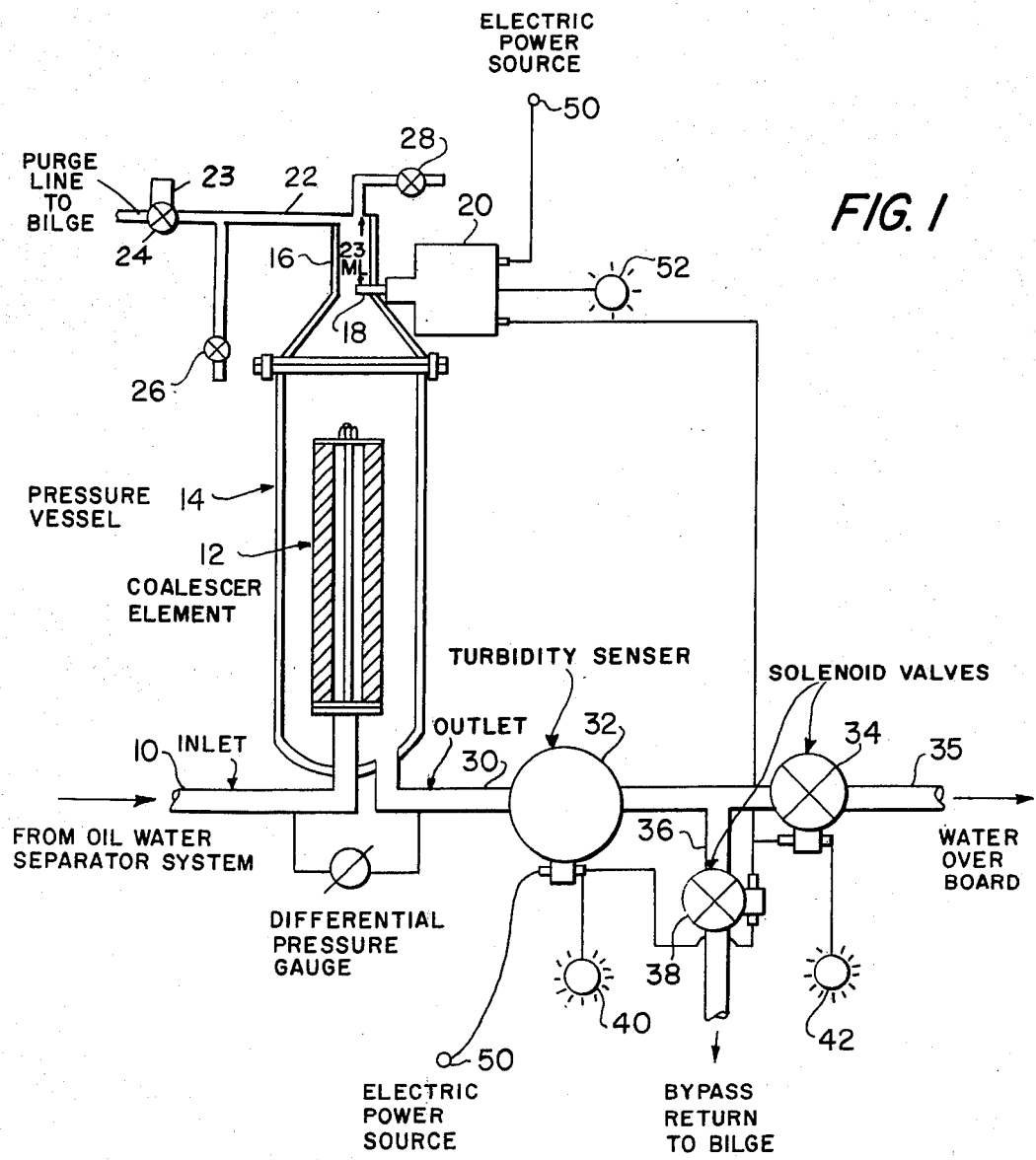
FIG. 1 is a schematic illustration of an embodiment of an oil-in-water monitoring system according to the present invention.

FIG. 1 shows an embodiment of the invention. An inlet line 10 from an oil-water separator system feeds into a coalescer/filter (or simply coalescer) element 12 located inside a pressure vessel 14. The pressure vessel 14 has an oil-collection section 16 at the top for which the volume is easily calculated. The oil-collection section is convenient to have since it makes the volume from the top to any lower level easy to calculate if the shape is well-chosen as, for example, the cylindrical shape shown. However, an oil-collection section is not absolutely necessary. The oil would collect at the top of the pressure vessel any how and it is just a question of selecting the proper level for installation of the sensing probe 18 which must be at the bottom horizontal level of the desired oil volume.

An oil-sensing probe 18, which is part of the interface sensing-probe assembly 20, is placed in the oil-collection section 16 at a predetermined level which will indicate when the amount of oil in the pressure vessel (i.e., in the effluent from the separator system) is higher than desired.

A purge line 22 to the bilge is connected to the oil-collection section 16. This bilge purge line can be opened by an electrically time, bilge-purge-line valve 24 or by a manual bilge-purge-line valve 26.

The oil-collection section 16 also has an air-eliminator valve 28 at its top. This valve may be manual or automatic.

The pressure vessel 14 has an outlet line 30 at the bottom feeding into a turbidity sensor 32, which may, for example, be of the photoelectric cell-type. The outlet line then goes through a solenoid shutoff valve 34 to an overboard vent line 35. An overboard by-pass line 36 branches off the outlet line between the turbidity senser 32 and the overboard-line shutoff valve 34 to return to the bilge. The by-pass line 36 also has a solenoid shutoff valve 38 connected to it which is activated by the turbidity senser 32. The latter also activates the turbidity alarm light 40.

The overboard-line solenoid valve 34 has an alarm indicator 42 associated with it which indicates that the valve has operated.

A differential pressure gauge is coupled across the coalescer element 12 (actually, coupled to the inlet line to and the outlet line from the coalescer element). If the coalescer element becomes clogged, the differential pressure across it increases and this is indicated by the gauge. The coalescer element can then be changed.

In operation, when the unit is turned on, liquid from the oil-water separator system flows through the coalescer element 12 and fills the pressure vessel 14. The air eliminator valve 28 is opened until a few drops of liquid appear at its outlet. The valve is then closed since this indicates that no air remains in the vessel and that it is filled with liquid.

When the liquid goes through the coalescer 12, any oil in the liquid is coalesced into droplets which rise to the top and accumulate in the oil-collection section 16. The clear water in the bottom of the vessel 14 is vented overboard by the pressure in the system through the overboard valve 34 which is normally open.

The electrically timed valve 24 is set for a predetermined time, for example, one hour; the time depends on the purity desired in the water to be vented overboard. If insufficient oil has accumulated in the oil-collection section 16 in this period to activate the sensing probe 18, the purge valve 24 is opened at the end of the timing period for a predetermined period of time, e.g., 3 seconds, which is sufficient to drain the oil from the oil-collection section.

If sufficient oil collects to be sensed by the probe 18 before the time period of the electrically timed valve expires, indicating that there is too much oil in the separator system liquid, the interfacting sensing-probe assembly 20 generates a signal which acts to close the overboard-line solenoid valve 34, energize its associated alarm light 42 and open the by-pass return line valve 38 to the bilge.

The alarm light 42 informs operating personnel that the manual purge valve 26 to the bilge must be opened to drain the oil from the oil-collection section . When this is done, the signal from the probe assembly 20 ceases and the valves 34 and 38 return to their original conditions.

If the liquid contains a chemical emulsion of oil (e.g., oil, water and a surfactant) or if the amount of oil in the liquid is very greatly above the coalescing capacity of the coalescer element, the liquid coming through the outlet line 30 will be turbid. The turibidity senser 32 then provides a signal to energize its associated turbidity indicator 40, the overboard-line valve 34 and indicator 42, and the by-pass return valve 38. The energization of the turbidity indicator alarm light 40 warns the operator that the oil-water separator system is not functioning properly.

The exemplary figures given above are based on a flow rate of liquid from the separator system which is 10 gallons per minute, and a value of 10 parts per million or greater of oil in the liquid. This requires a volume of about 23 milliliters per hour of oil to trigger the oilsensing probe and shut off the system. Thus the time period of the electrically timed valve 24 is set for an hour.

It should be apparent that the alarm indicators may be bells rather than lights or any other type of indicator which will attract the operator's attention.

Figure 2:
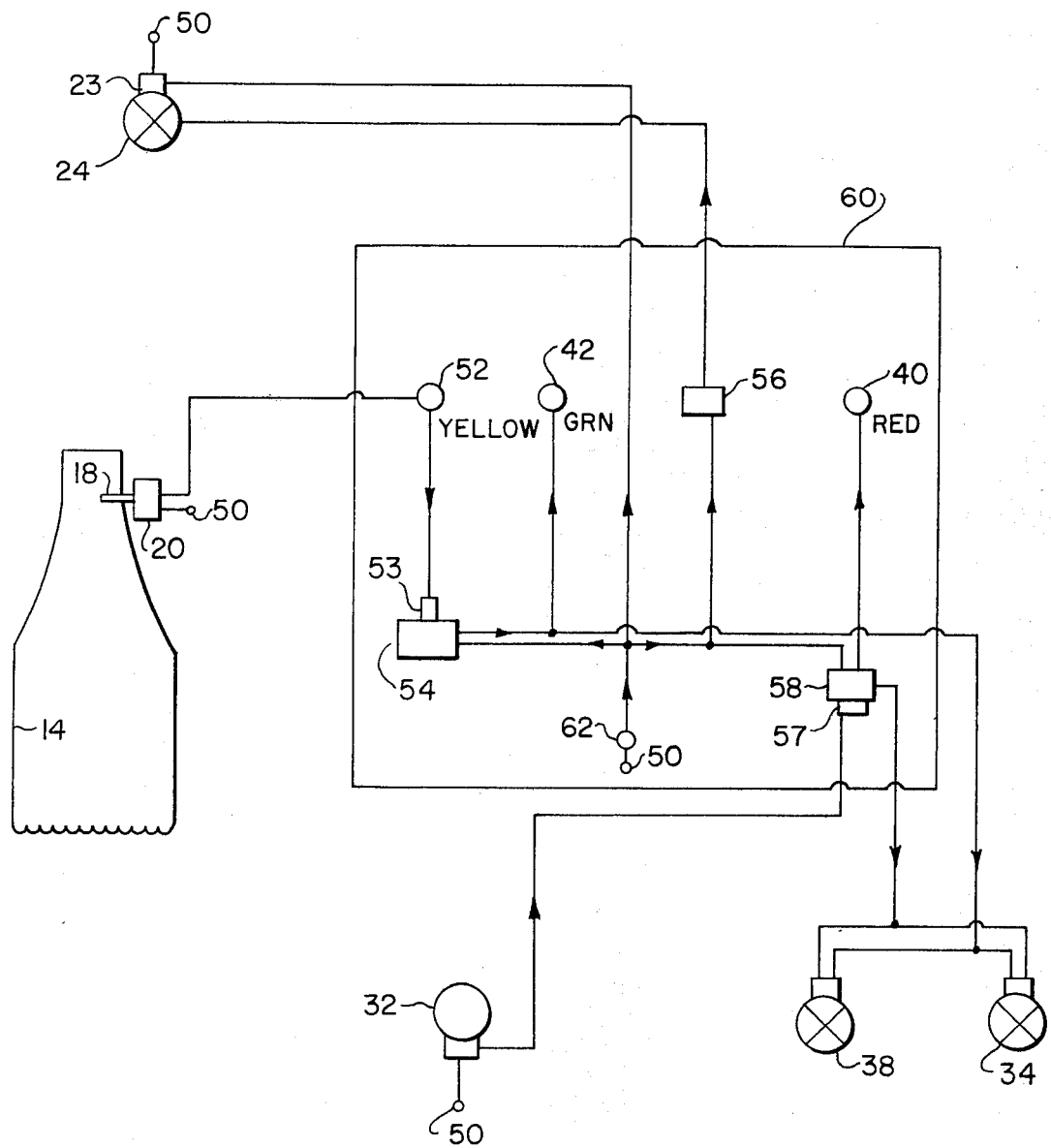
FIG. 2 is a schematic illustration of circuitry which can be used to implement the monitoring system shown in FIG. 1.

The electric system circuitry and components are well within the design capabilities of any electrical engineer. A typical circuit is exemplified in FIG. 2. (FIG. 1 does not show the details of the circuitry, except in a very general way.) Electrical power from a power source 50 is supplied to the components as needed. Circuit operations are indicated below.

1. Normal operation:

If less than 23 mil. of oil collects in the oil-collection section 16 in a given period of time, e.g., 1 hour, the bilge purge line timer 23 opens the bilge purge line valve 24 for the amount of time needed to empty the oil e.g., 3 secs. The timer 23 can then be reset by pressing the reset button 62 and another cycle is started. The reset circuit is unnecessary if the timer is of the automatic reset type.

2. Excess oil:

If 23 mil. of oil collects before the end of the 1-hour period, the oil-sensing probe 18 generates a signal which operates the oil-probe-signal indicator 52, e.g., a yellow light, on control panel 60 and starts the oil-probe-signal delay timer 53 which may, for example, provide a 15-second delay. At the end of the delay period, the signal is amplified by the oil-probe-signal amplifier 54 and sent to operate the overboard-line shutoff valve 34 (closing it); the overboard-line shutoff valve indicator 42 which may be a green light, for example; and the by-pass return line shutoff valve 38 (opening it). The operator is warned by operation of light 42 that he must manually empty the oil-collection section and look for the trouble. Of course, the operator can empty the oil collection system whenever he presses the reset button 62. This operates the oil-collection-section purging timer 56 which may, for example, provide a 3-second time period, or whatever is adequate to empty the oil-collection section 16. The purging timer 56 sends a signal of 3-seconds duration to the bilge line valve 24 opening it for that period of time and to the bilge purge line timer 23 resetting it.

3. Excess turbidity:

If the turbidity senser 32 senses an excess amount of turbidity in the efflux from the pressure vessel 14, a signal is sent to the turbidity delay timer 57 which may, for example, provide a 15-second delay. At the end of this time, the signal is amplified by the turbidity signal amplifier 58 and sent to operate the overboard line shutoff valve 34, the by-pass return line shutoff valve 38 and the turbidity indicator 40 which may, for example, be a red light.

Again, resetting of the timers may be accomplished by pressing the reset button 62, if the timers are of the type which do not reset automatically.

The system can be made to operate as a water-in-oil monitor by making certain obvious changes such as placing the collection section at the bottom of the pressure vessel to become a water-collection section, placing the purge line and its accessories at the bottom, utilizing a water coalescer unit, placing the outlet at the top, etc.

Obviously, many modifications and variations of the present invention are possible in light of the above teachings. It is therefore to be understood that, within the scope of the appended claims, the invention may be practiced otherwise than as specifically described.

What is claimed is:

1. An oil-in-water monitoring system for monitoring the effluent from a source of liquid comprising, in combination:

pressure vessel means for holding a liquid, said means having an inlet and an outlet port;

inlet pipe means connected to said inlet port for transferring at least a portion of the effluent from said source to said pressure vessel means;

outlet pipe means connected to said outlet port for transferring the liquid contents of said pressure vessel means to receiving means;

oil coalescer means for coalescing drops of oil from oil-containing liquids, said coalescer means being located within said pressure vessel means and being fed by said inlet pipe means;

oil-water interface sensing (OWIS) means for sensing an interface between oil and water, said OWIS means being located near the top of said pressure vessel at a level which measures off a predetermined volume at the top, said volume being called the oil-collection section, said OWIS means providing an output signal when said oil-collection section is filled with oil;

purge line means connected to said oil-collection section for emptying the oil therefrom;

first valve means for controlling the flow of liquid through said purge line means, said valve means being normally closed;

first timing means for maintaining said first valve means closed for a predetermined first period of time and opening said first valve means for a sufficient time to empty said oil-collection section ;

second valve means for controlling the flow of liquid through said outlet pipe means, said second valve means being normally open;

by-pass pipe means connected to said outlet pipe means between said outlet port and said second valve means for by-passing the flow of liquid through said outlet pipe means to a receiver other than said receiving means; and third valve means for controlling the flow of liquid through said by-pass pipe means, said third valve means being normally closed, the output signal from said OWIS means bein transferred to said second and third valve means to cause them to close and open, respectively, the output signal from said OWIS means occurring only when said oil-collection section fills with oil before the end of said first period of time.

2. A system as in claim 1, further including:
first indicating means associated with said OWIS means for indicating when said OWIS means is providing an output signal.

3. A system as in claim 2, further including: second indicating means associated with said second valve means for indicating the closure of said second valve means.

4. A system as in claim 1, further including:
fourth valve means associated with said oil-collection section for bleeding air from said pressure vessel means.

5. A system as in claim 1, further including:
second timing means connected between said OWIS means and said second and third valve means for delaying the transfer of the output signal from said OWIS means to said second and third valve means for a predetermined period of time.

6. A system as in claim 1, further including:
turbidity sensing means connected in said outlet pipe means between said outlet port and said second and third valve means for detecting a turbidity condition of the liquid in the outlet pipe means equal to or more than a predetermined turbidity level and for generating an output signal when such turbidity condition is detected, said output signal being fed to said second and third valve means to cause them to close and open, respecitvely.

7. A system as in claim 1, further including:
pressure differential gauge means connected across said inlet and outlet pipe means for indicating the pressure existing therebetween.

8. A system as in claim 1, further including:
first indicating means associated with said OWIS means for indicating when said OWIS means is providing an output signal;
second indicating means associated with said second valve means for indicating the closure of said second valve means;
second timing means connected between said OWIS means and said second and third valve means for delaying the transfer of the output signal from said OWIS means to said second and third valve means for a predetermined period of time; and
turbidity sensing means connected in said outlet pipe means between said outlet port and said second and third valve means for detecting a turbidity condition of the liquid in said outlet pipe means equal to or more than a predetermined turbidity level and for generating an output signal when such turbidity condition is detected, said output signal being fed to said second and third valve means to cause them to close and open, respectively.

9. A system as in claim 8, further including:
third indicating means associated with said turbidity sensing means for indicating the generation of an output signal by said turbidity sensing means.

10. A system as in claim 8, further including:
reset means connected to said first and second timing means for resetting them to their original conditions.

11. A system as in claim 8, further including:
third timing means connected between said turbidity sensing means and said second and third valve means for delaying the application of the output of signal of said turbidity sensing means for a predetermined period of time.

12. A system as in claim 11, further including:
reset means connected to said first, second and third timing means for resetting them to their original conditions.

* * * * *